L. CAMPBELL.
Cotton Gin.
No. 1,163.
Reissued April 2, 1861.
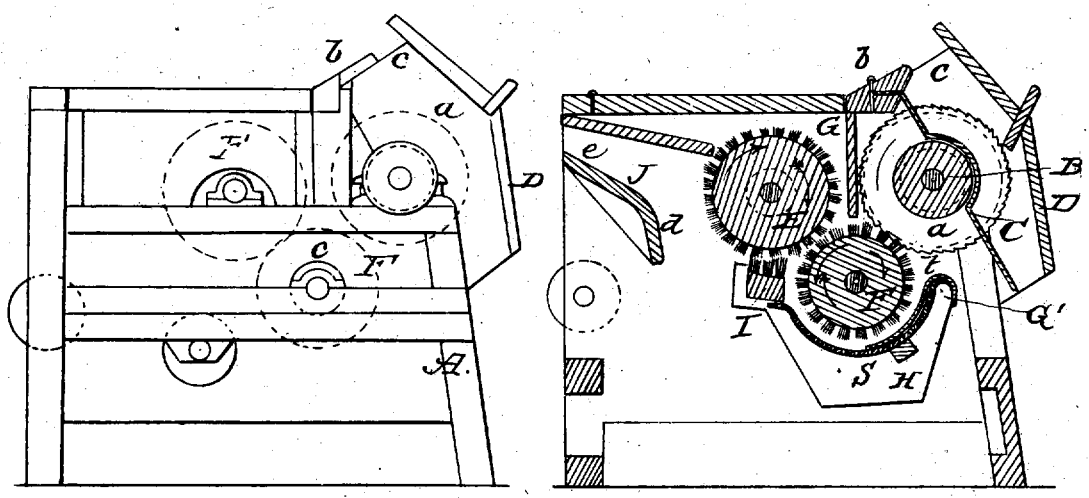
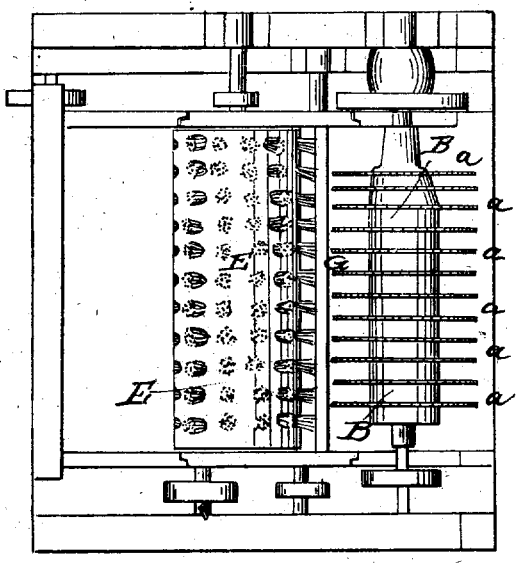
N. PETERS, Photo-Lithographer, Washington, D. C.

UNITED STATES PATENT OFFICE.

LEONARD CAMPBELL, OF COLUMBUS, MISSISSIPPI, ASSIGNOR TO L. CAMPBELL AND T. W. BROWN.

IMPROVEMENT IN COTTON-GINS.

Specification forming part of Letters Patent No. 12,894, dated May 22, 1855; Reissue No. 1,163, dated April 2, 1861.

*To all whom it may concern:*

Be it known that I, LEONARD CAMPBELL, of Columbus, in the county of Lowndes and State of Mississippi, have invented a new and useful Improvement in Cotton-Gins; and I do hereby declare that the following is a full, clear, and exact description of the same, reference being had to the accompanying drawings, forming a part of this specification, in which—

Figure 1 is a vertical longitudinal section; Fig. 2, an end elevation, and Fig. 3 a plan or top view, the cover and hopper of the gin being removed.

Similar letters of reference in each of the several figures indicate corresponding parts.

The nature of my invention consists, first, in ginning the cotton, stretching and straightening its fiber, and combing it at one continuous operation by means of a combination of the gin-saws, two brush-cylinders, and a stationary brush-bar, substantially as hereinafter described.

It consists, second, in the use of a stationary brush-bar, in combination with an upper rotary brush, substantially in the manner and for the purpose hereinafter described.

It consists, third, in the employment of a combined mote and cotton discharge board constructed of two planes placed at certain angles or in certain relative positions to each other, as will be hereinafter described.

It consists, fourth, in the employment of a wind and guard plate, G′, in combination with the brush F, that takes the cotton from the gin-saws, substantially in the manner hereinafter described.

It consists, fifth, in the combination of the gin-saw, the brushes, the brush-bar, the division wind-board, the perforated concave, the wind and guard plate, and cotton-separating board, substantially in the manner and for the purposes set forth.

To enable others skilled in the art to make and use my invention, I will proceed to describe its construction and operation.

A represents the main frame of the machine; B, the shaft, to which the gin-saws *a* are secured. The saws A rotate between the ribs C, the lower ends of which rest against the box D, while the upper ends are hinged to the frame A at *b*.

F is a brush-cylinder, the brushes of which overlap the saws *a* and pick the cotton from the saws when the machine is in operation.

E is another brush-cylinder, whose brushes are in contact with those of the cylinder F. The cylinders E F rotate in the same directions, as shown by arrows in Fig. 1, and the upper one, E, of the cylinders is made of a greater diameter than the lower one, F, while the driving-pulleys of both cylinders are of the same diameter.

It should be observed that both of the brush-cylinders are thickly clothed all around with short stubby bristles, and that the cylinder E is located on top of cylinder F, so that it acts down upon it. By this construction and arrangement the cotton not only is stripped from brush-cylinder F by brush-cylinder E, but also has its fiber carded and straightened before it is allowed to discharge. If the brushes were on the same horizontal line, and one thinly clothed with bristles, as in Sherrard's patent of 1844, the cylinders could not act down upon one another while the stripping is being accomplished, nor could they retain the cotton long enough to card and straighten its fiber. All they could do would be to deliver the cotton from the saw in a kinky condition, for the stripping-brush with four arms would act simply as a knocker or blower for periodically throwing off the cotton from the brush which takes the cotton from the saws.

H is a concave, made of wire-work, for the cylinder F to revolve in. This concave retains the cotton, but allows the trash, &c., to escape. At the upper end of the concave is placed a curved plate, which is about six inches in width, and extends from end to end of the concave. This plate is solid, and serves to close up the perforations of the concave H from the point S to the point *t*, and thus preventing a current of wind from being blown through said perforations, and to give directions to a current of wind which aids in giving direction to the cotton after it is taken from the saws. The current of wind caused by cylinder or brush F would be blown through the perforations between the points *s t*, and thus interfere with the passage of the cotton but for plate G, which, being solid, not only prevents this, but gives the cotton a direction in concave H and around cylinder F to where cylinder E strikes or strips cylinder F. This board also prevents the cotton from falling off the brush F onto the floor. This latter end would be accomplished by the concave; but, as said concave is perforated between the points *s t*, the difficulty from the influence of the wind, in the manner just stated, upon the cotton would be experienced if the wind-board G′ were not placed over the perforations of the concave in the manner shown.

I represents a brush-bar placed transversely in the frame A. Its brushes are in contact with those of the cylinder E, and when the latter operate on the former they tend to comb the fibers of the cotton which have become entangled by the operation of ginning. The cylinder E is separated from the gin-saws by the board G, for the purpose of preventing any current of air arising from the rotation of said cylinder from reaching the gin-saws *a*, which might have the effect of blowing the ginned cotton back on the said saws. J represents a mote-board, placed within the frame A at its rear end. This mote-board is formed of two planes, *d e*, one of which, *d*, is slightly inclined, forming a small angle with a vertical line. The other incline is at an angle of about forty-five degrees.

All the parts above described, with the exception of the driving-pulleys, are inclosed within a box, S, of the usual or most approved construction. The pulleys which impart to the saws and cylinders their rotating motions with their relative velocities are secured to their shafts outside of the frame and box of the machine.

The operation of the machine is as follows: The cotton is fed into the box D through the opening *c*, and motion is given to the saw-shaft B and brush-cylinders E F in any proper manner, the saws and cylinder rotating in the direction indicated by the arrows. The brush-cylinder F picks the cotton from the saws *a* and carries it around to the brush E, the cotton being kept between the points *s t* by the solid plate or blast cut-off G and the direction given to the current of air by said plate. Beyond the point *s* the cotton is prevented from detaching itself from cylinder F by the concave screen H. As the cotton passes through the concave to the brush-cylinder E the dust, dirt, and trash are separated from it and fall through the perforations of the concave. The brush-cylinder E strips the brush-cylinder F of its cotton—by reason of its periphery traveling at a greater speed than the periphery of cylinder F—straightens its fiber, cards, &c., and then brushes and combs it on the brush-bar I. The cotton, with its fiber carded, straightened, and combed, is thrown by the brush-cylinder E from the brush-bar I against the mote-board J, and at this point the motes, by their superior gravity and the position of the plane *d*, pass under the plane *e*, while the cotton, owing to its being specifically lighter than the motes, passes up the plane *d* and over the plane *e*.

By my invention a far more valuable staple is produced than has heretofore been produced by the usual cotton-gins.

What I claim as my invention, and desire to secure by Letters Patent, is—

1. Ginning the cotton, stretching and straightening its fiber, and combing the same at one continuous operation by means of a combination of the gin-saws *a*, brush-cylinders E F, and stationary brush-bar I, substantially in the manner herein described.

2. The use of a stationary brush-bar in combination with the brush-cylinder E, substantially in the manner and for the purpose described.

3. The employment of a combined mote and cotton discharge board constructed of two planes placed at certain angles or in certain relative positions to each other, substantially as and for the purposes set forth.

4. The employment of a wind and guard plate, G′, in combination with the brush F, that takes the cotton from the gin-saws, substantially as and for the purposes set forth.

5. The combination of the gin-saws, the brushes, the brush-bar, the division wind-board, the perforated concave, the wind and guard plate, and the combined mote and cotton separating board, substantially as and for the purposes set forth.

LEONARD CAMPBELL.

Witnesses:
STEPHEN A. BROWN,
DANIEL WILLIAMS.